July 3, 1928.

W. S. HARLEY ET AL

CYCLE SUPPORT

Filed June 5, 1925

Witness
R. Burkhardt

Inventors:
William S. Harley,
Arthur R. Constantine,
By Wilkinson, Huxley, Byron & Knight
attys.

Patented July 3, 1928.

1,675,551

UNITED STATES PATENT OFFICE.

WILLIAM S. HARLEY AND ARTHUR R. CONSTANTINE, OF MILWAUKEE, WISCONSIN, ASSIGNORS TO HARLEY-DAVIDSON MOTOR COMPANY, OF MILWAUKEE, WISCONSIN, A CORPORATION OF WISCONSIN.

CYCLE SUPPORT.

Application filed June 5, 1925. Serial No. 35,152.

The present invention relates to cycle supports.

More particularly the present invention relates to improvements in means for supporting a motorcycle or the like from the side, and has for one of its objects the provision of a simple mechanism which may be readily controlled by the rider for moving same to inoperative ground clearing position or to an operative ground engaging position.

A further object is to provide a side rest for a motorcycle which may be disposed in operative relationship with said motorcycle without requiring the lifting of any part of said motorcycle.

A further object is to provide a cycle support which may be quickly operated either to an operative or an inoperative position by a simple motion of the foot of the operator.

A further object is to provide an improved cycle support which may be operated by the rider without dismounting from the saddle.

A further object is to provide a cycle support which will operate as well on an up grade or a down as on a level surface.

A further object is to provide a cycle stand of simple construction which will automatically lock itself in operative position when the cycle is leaned to a parking position and which will automatically become disengaged when the cycle is again brought to a riding position.

A further object is to provide a cycle support which is unobtrusive in appearance and which does not reduce the ground clearance of the cycle.

A further object is to provide a cycle support which is light in weight and inexpensive to manufacture.

A further object is to provide a cycle support of simple construction which may be readily attached to motorcycles, as now commonly constructed, by persons having a minimum of mechanical skill and without the use of any special tools.

A further object is to provide a cycle stand of simple and durable construction.

A further object is to provide a cycle stand which with a kick of the foot of the operator will be moved and held in operative position, which when the machine is leaned to parking position will automatically lock said cycle stand against movement, and which when the cycle is again raised to riding position will, after a simple kick of the foot of the operator, move to unobtrusive ground clearing position.

Further objects will appear as the description proceeds.

Referring to the drawings—

Figure 1:
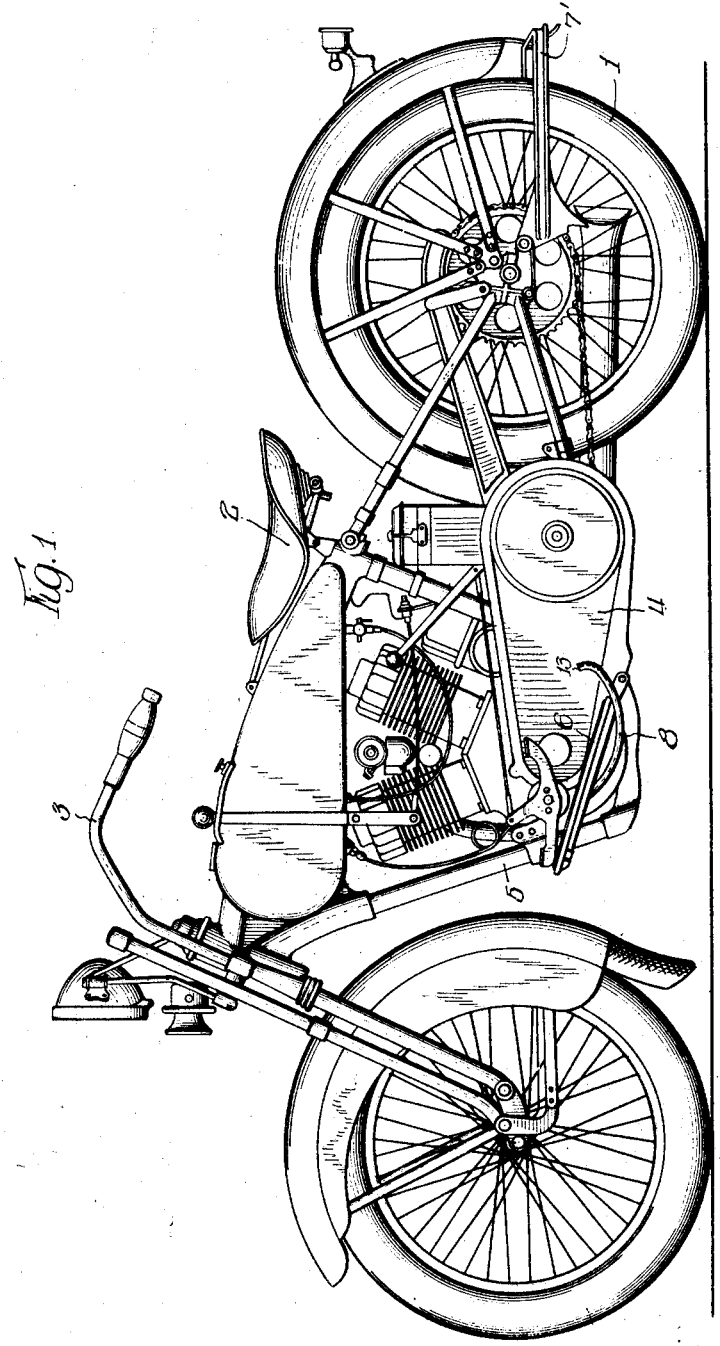
Figure 1 is a view in side elevation of a motorcycle employing a cycle support embodying the principles of the present invention.
Figure 2:
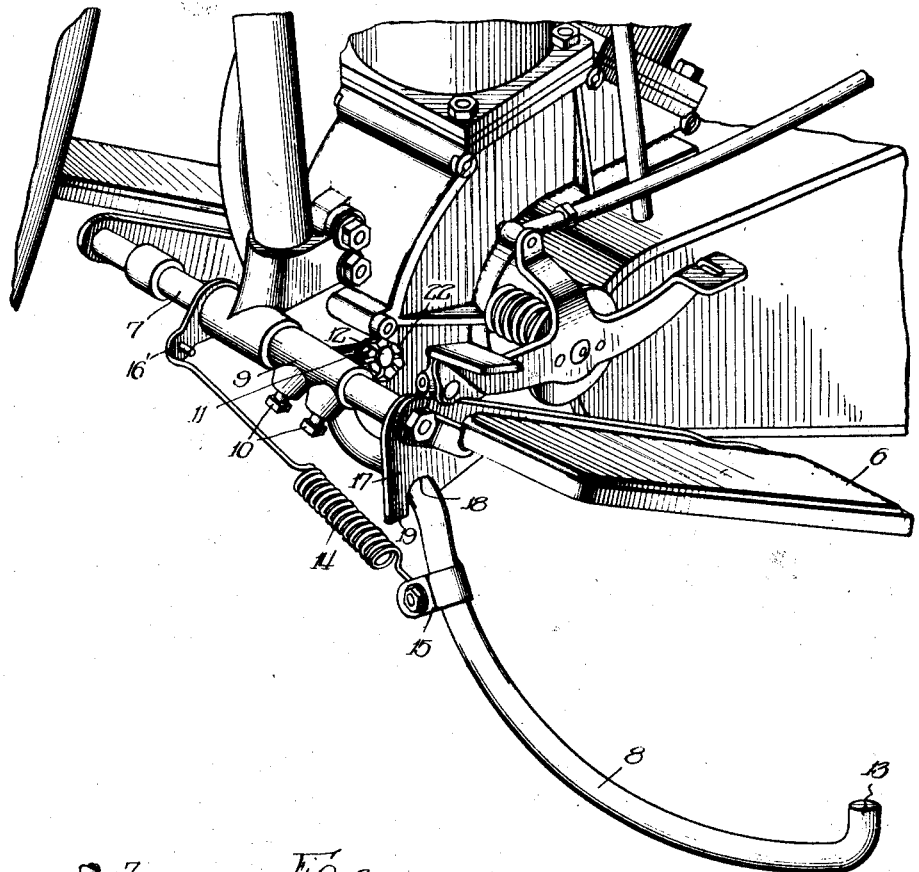
Figure 2 is a perspective view of part of a motorcycle illustrating said embodiment of the present invention.

Figure 1 illustrates, more or less diagrammatically, a motorcycle of well known construction. The details of said motorcycle need not be specifically described, but reference may be had to the wheels 1—1, saddle 2, handle bars 3, guard 4, the vertical frame member 5, the foot boards 6 (one of which is located on each side of the machine), the foot board supporting bar 6', and the forward transverse support rod 7 (Figure 2). The usual rear stand 7' may or may not be provided, as preferred. Adjacent to one or both of the foot boards 6 of the machine is a stand or support 8, which is pivotally supported by the transverse support rod 7 and which is adapted to occupy an unobtrusive ground clearing position in proximity to the foot board 6, or a ground engaging position disposed laterally of the motorcycle. As will appear hereinafter, the support or stand 8 is swingingly mounted about an axis which is angularly disposed relative to the line of ground engagement of the wheels of the motorcycle, whereby a simple swinging movement of said support or stand from a position in proximity to the foot board 6 to a position disposed laterally of the motorcycle will carry same from ground clearing position to a position at a decidedly lower level, and a reverse swinging movement of said support or stand will carry same to ground clearing position in proximity to the frame of the motorcycle.

Figure 3:
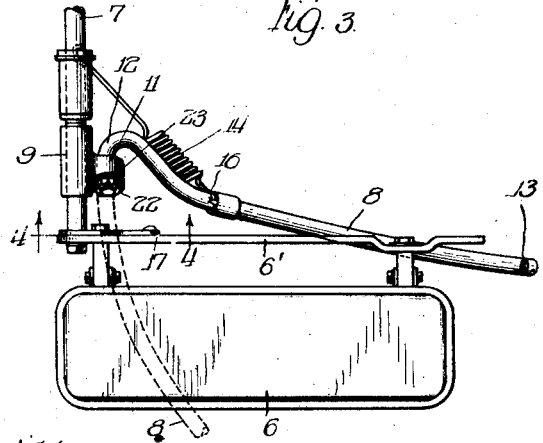
Figure 3 is a plan view looking downwardly toward one of the foot boards of the motorcycle, certain parts of the motorcycle being removed for the purpose of clarity.
Figure 4:
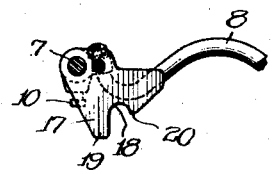
Figure 4 is a fragmentary view taken in the direction of the arrows 4—4 of Figure 3.

Referring particularly to Figures 2, 3 and 4, it will be noted that the transverse support rod 7 is provided with a sleeve or bracket 9, which is held in place upon said rod 7 by means of the set screws 10—10. Said sleeve or bracket 9 has formed integrally therewith the boss 11, which is in the form of a sleeve having its axis disposed in angular relationship with the axis of the transverse support rod 7, and also in angular relationship with the line of ground engagement of the wheels of the motorcycle, (i. e., under normal conditions, in angular relationship with a horizontal plane). Said sleeve 11 is adapted to loosely receive the turned over end 12 of the stand or support 8 to permit a limited amount of play of said member 8 in a vertical plane. The transverse support rod 7 is located adjacent to the lower extremity of the frame of the motorcycle, and said support or stand 8 is curved in such fashion that when the support or stand 8 is disposed laterally of the machine the outer extremity of said support or stand 8 will lie at a level decidedly lower than the transverse support rod 7. Due to the angularly disposed axis of the sleeve 11, which swingingly supports the end 12 of the support or stand 8, the arc of movement of said support or stand 8 is angularly disposed relative to the ground line of the wheels 1—1 of the motorcycle. When said support or stand 8 is swung to a position in proximity to the motorcycle, each portion of said support or stand 8 will lie at levels above the lowermost portion of the frame of the motorcycle. The outer extremity of the support or stand 8 is provided with the upturned portion 13, which may be conveniently kicked by the foot of the rider of the motorcycle.

The support or stand 8 is held selectably either in operative or inoperative position by means of the spring 14. One extremity of said spring 14 is connected to the collar 15 which encircles said support or stand 8. In order to provide a stop to prevent movement of the collar 15 along said support or stand 8, a lip or burr 16 may be swedged out of the material of said support or stand 8. The other extremity of the spring 14 is connected to the plate 16' which is fixed upon the transverse support rod 7. The spring 14 is a tension spring and will hold said support or stand 8 selectably in operative or inoperative position, depending upon whether said support or stand 8 is positioned upon one side or the other of the line of greatest extension of the spring 14; that is to say, said spring 14 will hold said support or stand 8 selectably upon either side of its dead center. The foot board supporting bar 6' will limit the position of the support or stand 8 when said support or stand 8 is positioned on that side of dead center closer to the foot board 6. In order to limit the position of the support or stand 8 when said support or stand 8 is moved to a position displaced from the foot board 6, the catch plate 17 is provided. Said catch plate 17 is non-rotatably supported upon the transverse support rod 7 and is notched as indicated by the numeral 18 in Figure 4. Said notch 18 is defined by the downwardly extending lip 19 and the downwardly extending lip 20, said lip 20 extending downwardly a materially less distance than does the lip 19. The sleeve 11, as noted above, receives the end portion 12 of the support or stand 8 only loosely, so that a certain amount of play is provided between said portion 12 and sleeve 11. A nut 22 is provided at the end of the portion 12 of the support or stand 8, which nut may overlie a washer 23. Said washer 23 and nut 22 limit movement of the end portion 12 of the support or stand 8 in one direction. Tension of the spring 14 tends to hold the washer 23 in engagement with the sleeve 11.

By reason of the play of the end portion 12 of the support or stand 8 within the sleeve 11, relative movement is possible between said support or stand 8 and the catch plate 17 in a vertical plane. Said play should be sufficient in amount to permit the support or stand 8 to pass the lip 20 of said catch plate 17 and to permit said support or stand 8 to seat itself within the notch 18 of said catch plate 17. The amount of said play will not be sufficient, however, to permit said support or stand 8 to pass the lip 19 of said catch plate 17. Said lip 19, therefore, will limit swinging movement of said support or stand 8 in a direction away from the foot board 6. The member 8 will preferably be a round bar, inasmuch as a round bar is economical of material, easy to manufacture, and can be made very strong.

The mode of operation of the above described embodiment of the present invention will be clear without detailed description. Under normal running conditions the support or stand 8 will be located in proximity to the foot board 6, as shown in Figure 1. The spring 14 will bias said support or stand 8 to such a position by reason of the fact that the tension of said spring 14 will at this time be positioned on that side of the pivotal center of said support or stand 8. Due to the angularly disposed axis of swing of the support or stand 8, said support or stand will be disposed in a position giving all of the ground clearance desired; that is to say, said support or stand 8 will give all the ground clearance provided by the frame of the machine.

When it is desired to move the support or stand 8 to operative position the operator will kick the extremity 13 of said support or stand 8 with his foot and will move same against the tension of spring 14 until said spring 14 passes across the pivotal center of said support or stand 8, after which said spring will urge said support or stand 8 against the lip 19 of the catch plate 17. This movement of the support or stand 8 to a position disposed laterally of the machine may be accomplished before the machine is brought to a stop, or, if preferred, after said machine has been brought to a stop. With the support or stand 8 abutting against the lip 19 of the catch plate 17, the machine may be leaned over in parking position. This movement will move the catch plate 17 down upon the support or stand 8, whereby said support or stand 8 will be positioned within the notch 18. The weight of the motorcycle leaning upon said support or stand 8 will securely lock said support or stand 8 against swinging movement. The machine is thus supported in a slightly inclined position. Due to the angular position of the axis of swing of the support or stand 8, the outer extremity of said support or stand 8 is now at a much lower level than the frame of the motorcycle, so that only a minimum of leaning of the motorcycle is required to lock the support or stand 8 within the notch 18 of the catch plate 17. When the motorcycle is again raised to approximately vertical position, the looseness of the fitting of said support or stand 8 within the sleeve 11 will permit said support or stand 8 to free itself from the notch 18, the spring 14 accomplishing the positive freeing of said support or stand 8 from said notch. After said support or stand 8 has been freed from the notch 18, the operator of the motorcycle may with a slight kick against the extremity 13 of the support or stand 8 move same beyond dead center; that is to say, the operator may move same to a position wherein the spring 14 will bias the support or stand 8 in proximity to the frame of the machine. As clearly shown in Figure 1, in the position last mentioned the support or stand 8 underlies the foot board 6, the extremity 13 lying in a position, however, whereby it may be readily kicked by the operator when the operator desires to move same out of operative position laterally of the motorcycle.

The angular position of the axis of swing of the support or stand 8 causes said support or stand to swing at an angle to the ground, so that the vertical position of the outer extremity of said support or stand 8 varies greatly between its laterally extended position and its inoperative position.

The rider may move the support or stand 8 while the machine is in motion, and when said machine comes to a full stop, said machine is merely leaned over on the side toward said support or stand 8 (to the left side in the illustrated embodiment). The motor may be started with the support or stand in supporting position, and, when starting ahead, the operator may readily move the support or stand to inoperative position by a mere kick with his foot. Should the operator forget to move the support or stand to inoperative position, no difficulties could occur, for the reason that said support or stand will automatically become released from the notch 18 of the catch plate 17 when the motorcycle is put in vertical position. The first obstruction met, or the making of a turn to that side upon which said support or stand is located, will knock back said support or stand to its inoperative position.

Though a preferred embodiment of the present invention has been described in detail, it will be clear that many modifications will occur to those skilled in the art. It is intended to cover all such modifications that fall within the scope of the appended claims.

What is claimed is—

1. In combination, the frame of a motorcycle, a bracket carried by said frame, a support swingingly carried by said bracket, the axis of swing of said support being angularly disposed relative to the line of ground contact of the wheels of said motorcycle, said bracket and said support having sufficient play to permit movement in a vertical plane of said support relative to said frame, and a catch member rigidly mounted relative to said frame, said catch member having a pair of abutment portions defining a notch for receiving said support, one of said abutment portions being of sufficient length to abut said support throughout its range of play in a vertical plane, the other of said abutment portions being of sufficiently less length to permit swinging movement of said support when said support is in its lowermost vertical position.

2. In combination, the frame of a motorcycle, a bracket carried by said frame, a supporting member swingingly carried by said bracket, the axis of swing of said support rod being disposed angularly with reference to a horizintal plane when said motorcycle is upright, said supporting member being adapted to swing to a position adjacent to said frame at one extremity of its swing and in ground engaging position laterally of said frame at the other extreme of its swing, a spring for biasing said supporting member selectably to the two extremes of its swinging movement, and a catch member for locking said supporting member against swinging movement when said supporting member is performing supporting functions, said spring being positioned to urge said supporting member out of locking relationship with said catch member.

3. In combination, the frame of a motorcycle, a bracket carried thereby, a supporting member swingingly carried by said bracket, the axis of swing of said supporting member being angularly disposed with reference to a horizontal plane when said motorcycle is upright, said supporting member being a round bar, a catch member having a guide portion for engaging said round bar and having a notch adapted to receive said round bar, the metal defining one side of said notch constituting an abutment to limit the swing of said supporting member, and the metal defining the other side of said notch constituting a locking portion for preventing swinging movement of said supporting member when said supporting member is performing supporting functions.

4. In combination, the frame of a motorcycle, a bracket carried thereby, a supporting member swingingly carried by said bracket, the axis of swing of said supporting member being angularly disposed with reference to a horizontal plane, said supporting member being a round bar, a catch member having a guide portion for engaging said round bar and having a notch adapted to receive said round bar, the metal defining one side of said notch constituting an abutment to limit the swing of said supporting member, and the metal defining the other side of said notch constituting a locking portion for preventing swinging movement of said supporting member when said supporting member is performing supporting functions, and a spring having the triple function of biasing said supporting member to one limit of its swinging movement, to the other limit of its swinging movement, and to urge said supporting member out of locking relationship with said catch member.

5. In combination, the frame of a motorcycle, a bracket carried by said frame, a support swingingly carried by said bracket, said bracket and said support having sufficient play to permit movement in a vertical plane of said support relative to said frame, and a catch member rigidly mounted relative to said frame, said catch member having a pair of abutment portions defining a notch for receiving said support, one of said abutment portions being of sufficient length to abut said support throughout its range of play in a vertical plane, the other of said abutment portions being of sufficiently less length to permit swinging movement of said support when said support is in its lowermost vertical position.

6. In combination, the frame of a motorcycle, a bracket carried thereby, a supporting member swingingly carried by said bracket, the axis of swing of said supporting member being angularly disposed with reference to a horizontal plane when said motorcycle is upright, said supporting member being elongated, a catch member having a guide portion for engaging said supporting member and having a notch adapted to receive said supporting member, the metal defining one side of said notch constituting an abutment to limit the swing of said supporting member and the metal defining the other side of said notch constituting a locking portion for preventing swinging movement of said supporting member when said supporting member is performing supporting functions.

Signed at Milwaukee, Wisconsin, this 1st day of June, 1925.

WILLIAM S. HARLEY.
ARTHUR R. CONSTANTINE.